(12) United States Patent
Prasad

(10) Patent No.: US 10,424,974 B2
(45) Date of Patent: Sep. 24, 2019

(54) AMBIENT INTELLIGENCE BASED ENVIRONMENT SAFE INTERFERENCE FREE CLOSED LOOP WIRELESS ENERGY TRANSFERING/RECEIVING NETWORK WITH HIGHLY FLEXIBLE ACTIVE ADAPTIVE SELF STEERING MULTILEVEL MULTICAST COHERENT ENERGY POWER STREAMS

(71) Applicant: Muthukumar Prasad, Tamil Nadu (IN)

(72) Inventor: Muthukumar Prasad, Tamil Nadu (IN)

(73) Assignee: Prasad Muthukumar, Salem, Tamilnadu (IN)

( * ) Notice: Subject to any disclaimer, the term of this patent is extended or adjusted under 35 U.S.C. 154(b) by 467 days.

(21) Appl. No.: 14/654,847

(22) PCT Filed: Dec. 27, 2013

(86) PCT No.: PCT/IN2013/000810
§ 371 (c)(1),
(2) Date: Jun. 23, 2015

(87) PCT Pub. No.: WO2014/102828
PCT Pub. Date: Jul. 3, 2014

(65) Prior Publication Data
US 2015/0340875 A1    Nov. 26, 2015

(30) Foreign Application Priority Data
Dec. 31, 2012   (IN) .......................... 5543/CHE/2012

(51) Int. Cl.
*H02J 50/30* (2016.01)
*G06F 1/32* (2019.01)
(Continued)

(52) U.S. Cl.
CPC ............ *H02J 50/30* (2016.02); *G06F 1/3203* (2013.01); *H02J 17/00* (2013.01); *H02J 50/40* (2016.02); *H02J 50/60* (2016.02); *H02J 50/90* (2016.02)

(58) Field of Classification Search
CPC .. H02J 5/005; H02J 17/00; H02J 7/025; H02J 50/30; H02J 50/90; H02J 50/40; H02J 50/60; G06F 1/3203
(Continued)

(56) References Cited

U.S. PATENT DOCUMENTS 8,629,803 B2 * 1/2014 Pattabiraman .......... G01S 19/11
342/357.29
8,868,141 B2 * 10/2014 Subramanian .... H04W 52/0251
455/574
(Continued)

*Primary Examiner* — Dinh T Le
(74) *Attorney, Agent, or Firm* — Prasad Muthukumar

(57) ABSTRACT

Contextually Networked Autonomous Self-Steering Laser Beam is a technique to transfer wireless energy through an ambient intelligence based environment-safe interference-free network of actively self-steering laser beams. CNSLB comprises of (i) a network of sensors in power source, power-scavenging devices and environment to sense/track the real-time change in environmental objects and users with relative distance, orientation and position between the Line of Sight of power source and scavenging device, (ii) a network of power source with laser beam generating and self-steering mechanism, (iii) a photo voltaic cell integrated in scavenger to receive power, (iV) a processing unit on power source, scavenging device and environment that computes the laser beam's steering angle, intensity, selects right power source based on environmental condition and photovoltaic cell on power scavenging device's location, position and orientation (v) a communication system for
(Continued)

sharing information (vi) may utilize a passive power source like reflectors to relay the power from power source to scavenging device.

12 Claims, 2 Drawing Sheets

(51) Int. Cl.
*H02J 17/00* (2006.01)
*H02J 50/40* (2016.01)
*H02J 50/90* (2016.01)
*H02J 50/60* (2016.01)
*G06F 1/3203* (2019.01)

(58) Field of Classification Search
USPC .......................................................... 307/104
See application file for complete search history.

(56) References Cited

U.S. PATENT DOCUMENTS

| | | | | |
|---|---|---|---|---|
| 9,072,107 B2* | 6/2015 | Gauvreau | ............. | H04L 5/0053 |
| 9,417,331 B2* | 8/2016 | Valentino | ............... | G01J 1/0219 |
| 9,525,311 B2* | 12/2016 | Menegoli | ................ | H02J 50/15 |
| 9,654,179 B2* | 5/2017 | Shultz | .................. | H04B 5/0012 |

* cited by examiner

Contextually Aware Network of Power Sources with Multi-Level Self-Steering Laser Beam to Transfer Energy to Power Scavenging Devices

POWER SOURCE

POWER SCAVENGING DEVICE

AMBIENT INTELLIGENCE BASED ENVIRONMENT SAFE INTERFERENCE FREE CLOSED LOOP WIRELESS ENERGY TRANSFERING/RECEIVING NETWORK WITH HIGHLY FLEXIBLE ACTIVE ADAPTIVE SELF STEERING MULTILEVEL MULTICAST COHERENT ENERGY POWER STREAMS

CROSS REFERENCE TO RELATED APPLICATION

This patent application claims the benefit of Indian Provisional application No. 5543/CHE/2012 filed Dec. 31, 2012. The same application is incorporated by reference herein.

STATEMENT REGARDING FEDERALLY SPONSORED RESEARCH OR DEVELOPMENT (Not Applicable)

THE NAME OF THE PARTIES TO A JOINT RESEARCH AGREEMENT (Not Applicable)

STATEMENT REGARDING PRIOR DISCLOSURES BY THE INVENTOR OR A JOINT INVENTOR (Not Applicable)

BACKGROUND OF THE INVENTION

Field of Invention

Contextually Networked Autonomous Self-Steering Laser Beam [CNASLB] is related to wireless energy domain and more particularly into a technique for safe, efficient and reliably transfer energy through laser beam to power scavenging devices.

Related Art

1. US20090015075 A1 (Nigel Power, Llc) 9 Jul. 2007 the whole document.
2. U.S. Pat. No. 8,471,410 B2 (Witricity Corporation) 27 Sep. 2008 the whole document.
3. US20100038970 A1 (Nigel Power, Llc) 21 Apr. 2008 the whole document.
4. US20110074347 A1 (Aristeidis Karalis) 12 Jul. 2005 the whole document.

All the references cited above works with the principle to achieve wireless energy through electromagnetic coupling and induction. With electromagnetic coupling and induction techniques it's really hard to control and transfer power to specific device. Also designs with common power source from which one single wide angle beam or cone is utilised to transfer power in a broadcast manner to cover a particular area which has lot of issues and disadvantages like creating unnecessary user radiation exposure, interference with other objects & devices, creates electromagnetic pollution in user living area, also not safe for most of the environment, continuously transfer power to device that have sufficient power, waste of valuable power by continuously providing energy irrespective of availability of scavenging device, continuously providing energy to unwanted area. These systems don't not have precise knowledge of the power scavenging devices that are in need of power, environment to smartly act according to scenarios or status of environmental users and objects with respect power source and scavenging device. Broadcast wireless energy transfer devices transfer power to devices in the environment irrespective of devices that require power, devices the doesn't require power, device turned off, device in standby, devices with sufficient power backup etc in the environment. Also relaying on singly power won't assist in safe and reliable wireless power transfer and won't provide high availability according environmental condition and scenarios. In case of broadcast wireless power transfer system the user cannot have control over the power transfer through Authentication, Authorisation and Accounting.

Objective of the Invention

Objective of the invention is to precisely transfer wireless energy or power to scavenging devices photovoltaic cell through dedicated active and adaptive self-steering multi-level and multicast streams of high gain beams and coherent energy streams ultimately to precisely transfer power to required devices with right power, protecting the user by controlling the primary & secondary radiation exposure, adopt the power transfer according to change in environment, reduce unnecessary interference, reduce electromagnetic pollution and to save power.

BRIEF SUMMARY OF THE INVENTION

To overcome the drawbacks with other designs the CNASLB works with power source comprising self-steerable multi-level laser beam to smart, active and precisely transfer power to power scavenging devices. The CNASLB provides flexibility to user in such a way that the user do not always have to bring the scavenging device to a particular area as the CNASLB itself will assist the power source to find the precise location of the scavenging devices particularly with its photovoltaic cell thereby self-steer laser beam to transfer energy. The wireless power source and scavenging devices smartly interoperate with each other utilising ambient intelligence, spatial computing and processing corresponding parameters in a active closed loop manner for precisely tracking of devices with power reserve status, device—location, direction, dimension, orientation, polarisation, environment, usage scenario, operating modes thereby to transfer power. The CNASLB avoids unnecessary waste of power and interference and unlike other system that transfer power continuously irrespective of availability wireless client within scope or power on demand status. The CNASLB works in either one or combination of following According to one aspect the CNASLB comprising of a sensor system which utilises sensors to sense the environmental users and objects, a power source with a laser beam generating device integrated with a self-steering mechanism to steer the generated laser beam, a network of communication system for sharing information between power sources and power scavenging devices, a processing unit, a power scavenging device are devices that are in need of power, a photovoltaic cell on power scavenging device.

According to another aspect the CNASLB utilises of power source with multilevel laser beam generating device integrated with self-steering mechanism to power the scavenging devices. There are two types of power sources where one is active and another is passive. The active power source is integrated with actual laser beam generating device with self-steering mechanism and while the passive power source only have mirrors with self-steering mechanism to reflect/deflect the laser beam power from active power source to power scavenging devices.

According to another aspect the CNASLB utilises of a photovoltaic cell in all the active and passive power sources and power scavenging devices to receive the power from beamed laser source.

According to another aspect the CNASLB utilises a communication network between all the active and passive power sources and power scavenging devices for its seamless interoperations.

According to another aspect the CNASLB utilises a sensor system in all the active/passive power sources and power scavenging devices to sense the environmental status and accordingly transfer the power to scavenging devices.

According to another aspect the CNASLB comprises of a processing unit utilises processors and memory devices to process the information from sensor system signals, power scavenging devices that are in need of power, environmental status, power transfer and requirement status of all the active and passive power sources and power scavenging devices thereby accordingly generate control signal for autonomously steering the laser beam to power scavenging devices photovoltaic cell.

According to another aspect the CNASLB switches between multiple power sources to reliably transfer power according to change in dynamic environment and devices status like for example when an interference for laser beam lies between power source and scavenging devices.

According to another aspect of CNASLB the energy and power transfer levels are controlled according to nature of different devices, environment, device location, range, position, power requirement status.

According to another aspect the CNASLB works by forming network of power source that smartly interoperate with each other in scanning, monitoring and tracking the scavenging devices particularly with environment to active and adaptively vary laser beams according to change in environment to transfer power reliably and efficiently.

According to another aspect the CNASLB one or more coherent energy power source combine together to transfer power with more than one stream to single device for rapid energy transfer and charging according to power requirement of scavenging devices.

According to another aspect the CNASLB transfers power to device with power on demand based on power source sensing the status of scavenging device that have sufficient power or backup, device switched off, device in standby mode thereby to stop and control streaming of power to devices.

According to another aspect the CNASLB utilise static and autonomous self-steering mirror/reflector mechanisms that utilises the control signal from processing unit to divert, reflect and transfer the coherent energy from the power source to power scavenging devices that are out of scope of power source ultimately to transfer the power.

According to another aspect of CNASLB the power source and power scavenging device interoperate between each other to match the polarisation thereby to optimise and control the power loss due to polarisation mismatch.

According to another aspect of CNASLB the power sources interacts with ambient intelligent systems like home or office ambient intelligent systems for sensing and tracking movement of users to transfer power accordingly.

According to another aspect of CNASLB, to further enhance the flexibility the system utilise the power source to transfer power wirelessly to charging pads or mats, that provides flexibility of placing the charging pad in user convenient place in environment.

According to another aspect of CNASLB the power source comprises of at least one self-steerable laser beam generating mechanism, sensor system, processing unit, transceiver circuitry, antenna, power transmitting components light or laser source and the power sources are connected to external power sources.

According to another aspect of CNASLB the scavenging devices comprising of power receiving component photovoltaic cell integrated with self-steering mechanism, sensor system, processing unit, transceiver circuitry, antenna.

According to another aspect the CNASLB works with ambient intelligence system in environment with Sensor system, Processing unit, transceiver circuitry.

BRIEF DESCRIPTION OF THE DIAGRAM

To get a comprehensive understanding of the CNASLB, diagrams are described by examples.

DETAILED DESCRIPTION

Figure 1:
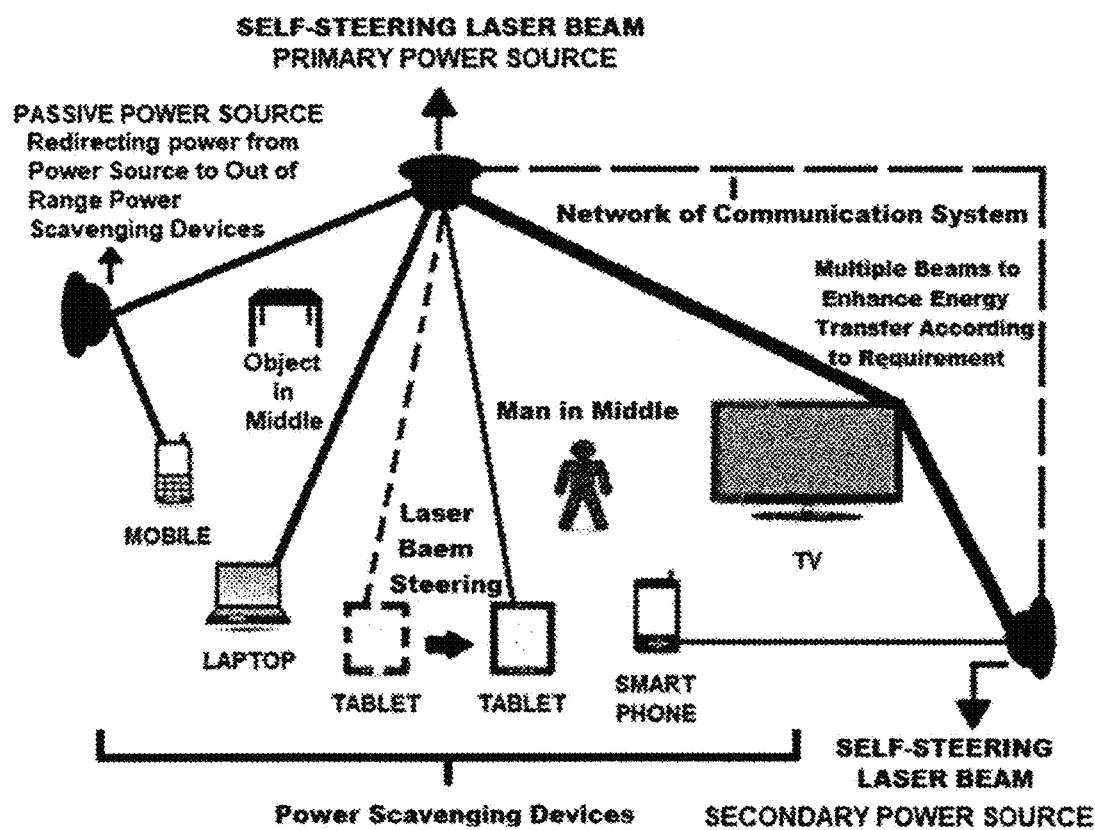
FIG. 1 illustrates cognitively networked multilevel self-steering laser beam controlling and transferring energy to power scavenging devices with Man or object in middle of LOS scenario.

FIG. 1 illustrates cognitively networked power source's 1 and 2 with multilevel self-steering laser beam generating devices that controls and transfers the energy to power scavenging devices by controlling and switching laser beam according to man or object in middle of LOS scenario, switch to alternative power source for reliable power transfer, power transfer levels are varied according to power requirement of power scavenging devices, power source control, steer and aligning the laser beam according to change in motion and orientation of the power scavenging devices, laser beam from multiple power sources are focused at the same device for rapid power transfer and a communication system network from actively transmitting and receiving real-time information between power sources and power scavenging devices utilising at least one of wired transceiver circuitry with interconnecting cables and wireless transceiver circuitry with antennas.

The Power sources, scavenging devices and ambient intelligence systems of the CNASLB comprise of sensor system that works based on one or combination of sensors, configurations, design, operating modes and usage scenarios. a) The sensor for sensor system is selected form the group comprising of proximity sensors, distance & range sensor, optical sensors, visual & infrared sensors, 2D & 3D [dimension] sensors, orientation sensors, accelerometer, gyro sensor, directional sensors, E-compass or magnetometer, position & location sensor, temperature sensor, humidity & moisture sensor, ultrasonic sensors, altitude sensor, belt pouch & clip sensor, cradle or holster sensor. b) The proximity sensors and sensor arrays capable of scanning, detecting, tracking and sensing the change in property [nature] of different proximity environments and various biological tissues, materials & bones with its direction, dimension, positions, multi layers & range with respect to device there by precisely sensing user head, body & handhold effects, effects of platform & environment on power scavenging device. The parameters utilised for sensing comprise of permittivity-$\varepsilon$, permeability-$\mu$, conductivity-$\sigma$, susceptibility, dielectric, capacitive sensing, capacitive displacement sensing, inductive sensing. The sensor system utilise one or more proximity sensors or sensor arrays optimally placed in various locations & positions according to device design for more precisely sensing in all possible directions.

The proximity sensor are selected from electromagnetic sensors, electrostatic sensors, acoustic, inductive, thermal, echo, capacitive, infrared, eddy current, ambient light, active & passive sensors. c) Gyro sensor, accelerometer, inclinometer, E-Compass or magnetometer to sense the change in orientation and direction of the scavenging device. The sensors utilised are selected with one to multi dimension and axis sensing capability. d) One or more sensors or cameras with visual, infrared [thermo graphic], ultrasonic and its combinations are optimally located in power source, scavenging devices and ambient intelligent system according to the design for scanning & sensing the environment, user & objects presence, face & body recognition with autofocus, iris recognition, imaging, scanning & sensing in multi direction & dimension, computing distance [range] of user & other proximity environment with respect to power source and scavenging device.

The infrared cameras utilised comprise of active infrared, passive infrared and its combinations. The system utilises 360 degree or omnidirectional sensors & cameras [visual & IR], popup cameras, front & rear cameras, side & corner cameras, 2D & 3D cameras with the lenses utilised comprising of regular camera lens, super ultra-wide angle lens, fisheye tense, extreme angle broadband metamaterial lenses, tuneable metamaterial lenses, super lenses, opto fluidics lenses, tuneable lenses ultimately for scanning and detecting the environment in all possible direction.

The system utilise active digital image processing and signal processing to sense the change in environment. According to design, configuration & scenarios the system utilise fisheye lens for sensing the change in environment and utilise other appropriate feasible fens cameras for further tracking of the humans & objects in environment. e) Distance or range sensors and cameras are selected form the ultrasonic range sensor, infrared range sensor, electromagnetic range sensors, acoustic range sensor, visual range sensor, photo electric range sensor that are optimally located to sense the range of user and proximity environment with respect to power scavenging device in all possible directions. f) Optimally located one or more thermo graphic or IR sensors, temperature sensors, sensors detecting proximity environments property with multilayer sensing, ambient light sensors, electromagnetic sensors, orientation sensors, sensing usage scenarios and operating modes with predetermined & tested lookup tables are utilised to more precisely sense the proximity environment and scavenging devices in user pockets & pouch with orientation. g) MIC and ambient light sensor to sense the change in sound and ambient light level on the environment of the power scavenging device. h) Temperature, moisture and humidity sensors to sense the device environments temperature, moisture and humidity of the scavenging device. i) The operating modes and usage scenarios comprising of mobile or scavenging devices direct phone call mode, speaker mode, hands free mode, headset mode, video call mode, Bluetooth mode, detecting key pad & touch screen usage, display orientation, Wi-Fi mode, internet access & browsing, download mode, games, streaming, standby mode, sensing data transfer and wireless modem mode. j) Position & location systems are selected from GPS, AGPS, GLONASS, satellite based positioning system, WiFi positioning system, cell sight positioning system, bluetooth positioning, Hybrid positioning system to sense the location & position of the power sources and scavenging devices. k) The sensor system utilising device display itself as proximity sensor and proximity sensor itself as range sensor. l) The sensor system utilise sensors comprising of fixed and tuneable sensitivity & range are selected according to design and scenarios. The sensor systems precision levels, sensing depth of dimension and multi-layer sensing are utilised according to design & requirements.

According to one aspect the power source of CNASLB comprise of coherent energy source line laser beam with signal processing capability for actively, varying and optimising the power transfer through shaping, controlling gain & directivity, adaptive beamforming, beam steering, switching, spatial processing & filtering, controlling transmit power levels comprises of coherent energy light source and LASER source. To get a comprehensive understanding of the CNASLB According to another aspect of CNASLB the power source and power scavenging devices utilises a communication system network comprising of both wired transceiver circuitry with interconnecting cables and wireless transceiver circuitry with antennas for actively sharing the real-time information between power sources, scavenging devices and status of environment ultimately to compute and optimise the power transfer level, polarisation, and frequency accordingly to provide an active, safe, efficient and reliable power transfer.

According to one aspect the CNASLB utilises a sensor system to precisely and sense and tracks environmental users/objects in real time, user proximity, scavenging devices position or location, direction, dimension, distance or range, orientation, nature or type of device with respect to power source, tracks users and objects in environment with respect to and between line of sight of power source and power scavenging devices thereby computing the relative position, orientation, direction, distance, polarisation between power source and scavenging to perform beam directing, forming, shaping and steering accordingly to precisely transfer power to scavenging devices. The system works irrespective of scavenging device location to transfer power utilising self-steering beams and streams. The CNASLB also accounts user proximity, usage scenarios and operating modes for computing and laser beam forming.

Power scavenging devices are handled in different proximity environment which influence the performance of power transfer due to electromagnetic interaction based on environments properties that leads to detuning, radiation pattern distortion, impedance mismatch, interference, electromagnetic pollution which in turn affects the whole environment. So when the configured power scavenging devices are within scope of the system the system sense & perform context aware computing in an adaptive closed loop manner to actively optimise the power transfer with coherent light source according to scenarios. The power source and scavenging device according to system design, configurations, scenarios and acting modes of the devices actively shares information & parameters between each other and utilise either one or more parameters like devices proximity environment with property, device orientations [antenna orientation], location, position, altitude, existing signal quality parameters to shape and optimise the coherent energy to transfer power accordingly.

Figure 2:
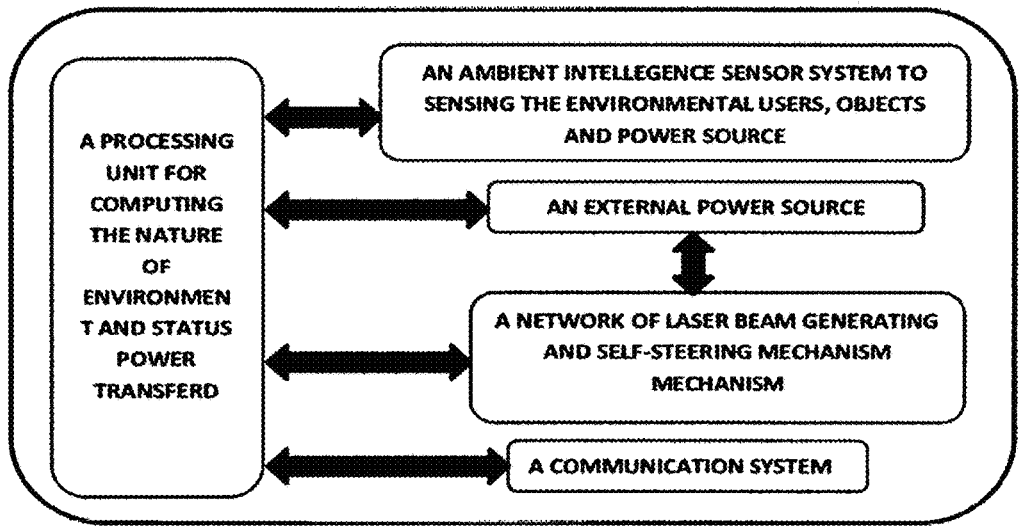
FIG. 2 illustrates the components of CNASLB power source and power scavenging devices.
Figure 2:
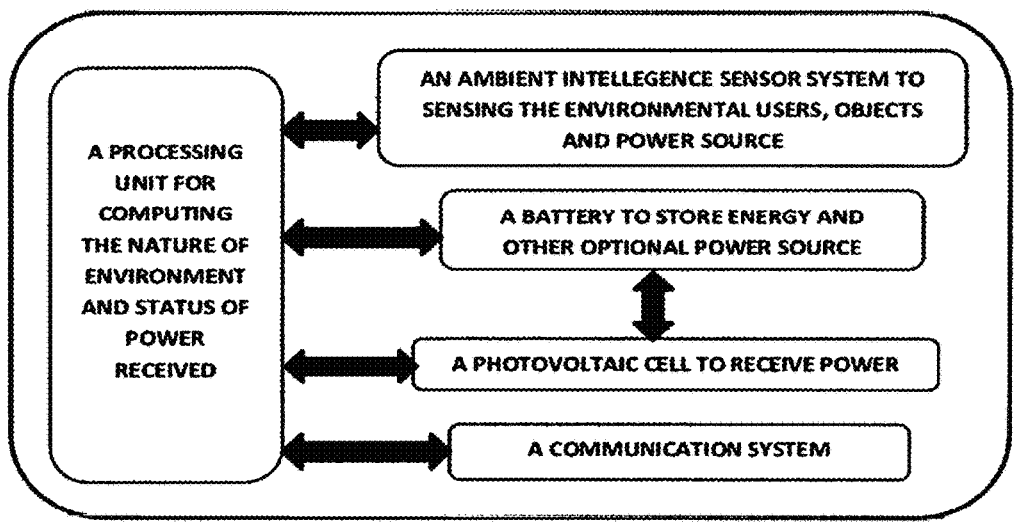

FIG. 2 illustrates the components of the power source and power scavenging devices where Power Source comprises of—a sensor system which utilises sensors to sense the environmental users and objects, a power source with a laser beam generating device integrated with a self-steering mechanism to steer the generated laser beam, a network of communication system for sharing information between power sources and power scavenging devices, a processing unit, a connection to external power source for its operation; and the Power Scavenging devices comprises of—a sensor system which utilises sensors to sense the environmental users and objects, a power source with a laser beam generating device integrated with a self-steering mechanism to steer the generated laser beam, a network of communication system for sharing information between power sources and power scavenging devices, a processing unit and photovoltaic cell for receiving the power from laser beam.

According to another aspect of CNASLB, one or more sensors or cameras either visual or infrared [thermographic] or combination of both and range sensors are optimally placed in the device [or around the device] according to design for sensing the proximity environment, detecting human presence, face & body recognition, computing distance or range of user & proximity environment thereby to shape the radiation pattern for protecting the user from radiation exposure and to optimise signal quality. The cameras and range sensors are optimally located in the scavenging device to scan for the user and environment in omni direction, sensing multi dimension, direction & distance of user & proximity environment. The system also utilise already existing front & rear cameras, side cameras and helps to protect the user in scenarios like video call, browsing, downloading, watching scavenging, games etc.

The CNASLB utilise correlation tables or field mapping tables or threshold level tables or lookup tables which are the comparison tables to actively check and compares the effects between predetermined and tested real world scenarios to the actual real world scenarios with which the system actively optimise the antenna radiation pattern and coherent energy source.

Already some of the scavenging devices like mobile devices comprise of cameras [in front and rear] and with little more sophistication these cameras can enhance it sense the human presence [face and body recognition] in day & night, proximity objects, distance, its range or distance calculation. Thermographic camera or infrared camera is a device that forms an image or video using infrared radiation, similar to a common camera that forms an image using visible light [visible spectrum] thus provides the system with thermal vision. All objects emit a certain amount of black body radiation as a function of their temperatures. The amount of radiation emitted by objects varies according to temperature, scenarios and nature of objects. Higher an object's temperature is, the more infrared radiation emitted as black-body radiation. The variations in the temperature is utilised by the thermographic camera to compute the picture of humans, proximity environments easily visible in a dark environment. It works even in total darkness because ambient light level does not matter. The human body have a range of infrared frequency and the CNASLB as designed to actively sense these for further computing. These sophisticated sensors are utilised to enhance the precision of the system in protect the users with most of the scenarios as well as optimising signal quality. The system helps the scavenging device to sense and feel the human presence and other proximity environments can be further utilised for the scavenging applications to work more precisely and lot of other potential applications like tracking, games, emergency situations, medical application etc.

The sensor system can even be enhanced to precisely sense difference between the actual user and others and can act accordingly [For security and privacy]. Applications based on thermography have lot of potential applications and non-invasive medical applications like infrared imaging of body, thermometer etc. As the continuous sensing by sensor system can consume battery power the sensors [with least to most power consuming sensors] of sensor system are smartly utilised according to scenarios, usage and operating modes to save the battery power. One or more sensors or cameras with visual, infrared [thermographic], ultrasonic and its combinations are optimally located in the scavenging device according to the design for scanning & sensing the environment, user presence, face & body recognition with autofocus, iris recognition, imaging, scanning & sensing in multi direction & dimension, computing distance [range] of user & other proximity environment with respect to device. The infrared cameras utilised comprise of active infrared, passive infrared and its combinations. The system utilises 360 degree or omnidirectional sensors & cameras [visual & IR], popup cameras, existing front & rear cameras, side & corner cameras, 2D & 3D cameras with the lenses utilised comprising of regular camera lens, super ultra-wide angle lens, fisheye lenses, extreme angle broadband metamaterial lenses, tuneable metamaterial lenses, super lenses, optofluidics lenses, tuneable lenses ultimately for scanning and detecting the environment in all possible direction.

According to design, configuration & scenarios the system utilise fisheye lens for sensing the change in environment and utilise other appropriate feasible lens cameras for further tracking of the objects in the environment. Since the digital image processing for face, iris & other objects recognition are hard with images & videos produced by fisheye lens camera which are intended to create a wide panoramic or hemispherical image with strong visual distortion the system can utilise it for sensing the change in environment and utilise other suitable lens camera for further tracking and recognition of humans and objects in the environment. This makes the tracking of objects easy and also saves the battery power by avoiding the continuous usage of multiple cameras. The whole system can be connect to renewable or non-renewable power source like solar or wind to completely automate the power transfer.

The embodiments of the CNASLB is not limited to listed scenarios described here or its combinations and the above presented are just examples. There may be other scenarios and those who skilled in field can understand and modify, enhance, alter the herein system without departing from the scope of the invention in its widest form.

The invention claimed is:
1. A Contextually Networked Autonomous Self-Steering Laser Beam [CNASLB] for transferring wireless energy utilising a network of closed loop laser beam control system that works according to power requirement status and relative location/position/orientation of power scavenging devices, relative status of environmental users; and objects where the Networked Autonomous Self-Steering Laser Beam comprising:
   a) a sensor system;
   b) a primary power source for generating a laser beam and including a laser beam self-steering mechanism to transfer power;

c) a processing unit coupled to the sensor system that includes at least one processor and memory device to compute a control signal for generating, steering and receiving the laser beam;

d) a secondary power source for generating and self-steering said beam laser energy, when the power scavenging devices are out of scope or out of range of the primary power source;

e) each power scavenging device comprising a photo voltaic cell for receiving the laser beam energy from said primary power source and the secondary power source;

f) a communication system network for sharing real time information between the sensor system, the primary power source, the secondary power source and the power scavenging devices;

h) a passive power source comprising at least one of reflectors or mirrors with a self-steering mechanism to redirect or reflect the laser beam from the primary power source and the secondary power source to the out of range power scavenging devices based on the control signal from the processing unit.

2. The CNASLB in claim 1, wherein the sensor system generates a trigger signal that works based on sensors, operating modes and usage scenarios, wherein the sensor system parameters comprising one of:

a) visual cameras, infrared or thermo-graphic cameras, ultrasonic sensors that are optimally located in the primary power source and the secondary power source, the scavenging devices and on environment to scan and sense the environmental objects in multi direction and dimension; environmental user's presence; face and body recognition with autofocus;

b) fisheye lens cameras, mobile device's existing front and rear cameras, side and corner cameras and 2D and 3D sensor cameras for scanning and detecting the environmental objects in ail possible direction;

c) property sensing sensor comprise one or more: dielectric sensors; electromagnetic sensors; electrostatic sensors; acoustic sensors; inductive and capacitive sensors; temperature sensors; echo sensors;

d) thermo-graphic or infrared sensors; eddy current sensors; ambient light sensors; ultrasonic sensors; belt pouch sensor, clip sensor, cradle or holster sensor; active and passive sensors;

e) the property sensing one or more sensors parameters comprising: permittivity-e; permeability-p; conductivity; susceptibility; dielectric; biological tissues; inductive and capacitive sensing; capacitive displacement sensing; inductive sensing; organic and inorganic property of power source, scavenging devices and environment platform and environment;

f) sensors for sensing change in power source and scavenging devices orientation, acceleration, altitude and direction comprising at least one gyro sensor; accelerometer; inclinometer; orientation sensors; attitude sensors and E-Compass or magnetometer;

g) distance or range sensors and cameras comprising at least one ultrasonic range/distance sensors; infrared range sensors; electromagnetic range sensors; acoustic range sensors; visual range sensors and photo electric range sensors that are optimally located to sense the relative range of the users and environment with respect to power source, scavenging devices and environment in all possible directions;

i) temperature, moisture and humidity sensors to sense the environment of the power source, scavenging devices and environment;

j) the operating modes and usage scenarios comprising at least one direct phone call mode; speaker mode; hands free mode; headset detection; video call mode; Bluetooth mode; detecting key pad and touch screen usage; display orientation;

h) Microphone (MIC) and ambient light sensor to sense a change in ambient sound and ambient light level on the environment and k) position and location sensing systems to sense the location and position of the power source, scavenging devices and environment.

3. The CNASLB in claim 1, wherein the memory device comprising comparison tables which is referred and utilised by the processing unit to compute the control signal to power the laser beam to the scavenging devices.

4. The CNASLB in claim 1, wherein the communication system comprising at least one wired or wireless network to share real-time information and parameters comprising of property of devices environment; photovoltaic cell orientation of the power scavenging device; range; direction; position & location; altitude; operating modes and usage scenario; thereby to direct, shape and optimise the power stream from the primary power source and the secondary power source to the scavenging devices.

5. The CNASLB in claim 1, further comprising wherein utilizes an identification mechanism for identifying the primary power source, the secondary power source, the passive power source and the power scavenging devices for authenticating, authorising, accounting thereby to have a seamless control over the power transfer.

6. The CNASLB in claim 1, wherein the works with communication systems network comprising of both wired and wireless network and work with modes of the device in master/slave architecture, infrastructure, peer to peer or one to one, adhoc, wireless mesh network.

7. The CNASLB in claim 1, where the laser beam energy and power transfer levels are controlled according to type or nature, its location, range, position, all according to power requirement, design, orientation, configuration and environment of different the power scavenging devices scenarios.

8. The CNASLB in claim 1, further comprising one or more the power sources combine together to transfer the power to a photovoltaic cell of the single power scavenging device photovoltaic cell to achieve rapid energy transfer according to power requirement status of the power scavenging devices.

9. The CNASLB in claim 1, the power transfer toggles between the network of the primary power source and the secondary power source to transfer the power when a user or other objects intervene or comes between the Line Of Sight [LOS] of the primary power source, the secondary power source and the each scavenging device.

10. The CNASLB in claim 1, wherein the beam laser energy further comprising multilevel laser beam that varies intensity of the laser beam to power the scavenging devices according to power consumption and requirement.

11. The CNASLB in claim 1, wherein the primary power source and the secondary power source smartly interoperate and toggle with each other in actively scanning, monitoring and tracking the power scavenging devices to transfer the power, continuously and efficiently.

12. The CNASLB in claim 1, wherein the power is transferred to the power to scavenging devices with power on demand; based on power source sensing the status of the power scavenging devices that have sufficient power or backup, device in standby mode thereby to stop and control streaming of power to devices.

* * * * *